(12) United States Patent
Widener et al.

(10) Patent No.: US 10,107,498 B2
(45) Date of Patent: Oct. 23, 2018

(54) INJECTION SYSTEMS FOR FUEL AND GAS

(71) Applicant: General Electric Company, Schenectady, NY (US)

(72) Inventors: Stanley Kevin Widener, Greer, SC (US); Lewis Berkley Davis, Jr., Niskayuna, NY (US); Gregory Thomas Foster, Greer, SC (US); Kaitlin Marie Graham, Greenville, SC (US); Krishnakumar Venkataraman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 14/567,753

(22) Filed: Dec. 11, 2014

(65) Prior Publication Data

US 2016/0169524 A1     Jun. 16, 2016

(51) Int. Cl.
*F23R 3/00* (2006.01)
*F23R 3/28* (2006.01)
(Continued)

(52) U.S. Cl.
CPC ............... *F23R 3/286* (2013.01); *F01D 9/06* (2013.01); *F02C 7/222* (2013.01); *F23R 3/34* (2013.01); *F23R 2900/03341* (2013.01)

(58) Field of Classification Search
CPC .. F23R 2900/03341; F23R 3/34; F23R 3/346; F23R 3/286; F23R 3/12; F23R 3/14; F01D 9/06; F23D 17/002
See application file for complete search history.

(56) References Cited

U.S. PATENT DOCUMENTS

| 4,438,625 A | 3/1984 | Rice |
| 4,735,052 A | 4/1988 | Maeda et al. |

(Continued)

FOREIGN PATENT DOCUMENTS

| EP | 1028237 B1 | 10/2003 |
| EP | 2199674 A1 | 6/2010 |

(Continued)

OTHER PUBLICATIONS

U.S. Appl. No. 14/5697,768, Final Office Action 1 dated Aug. 1, 2017, 18 pages.

(Continued)

*Primary Examiner* — Craig Kim
*Assistant Examiner* — Katheryn Malatek
(74) *Attorney, Agent, or Firm* — Ernest G. Cusick; Hoffman Warnick LLC (57) ABSTRACT

Embodiments of the present disclosure provide injection systems for fuel and air. According to one embodiment, an injection system can include a mixing zone embedded within a surface of a turbine nozzle and positioned between a first outlet and a second outlet, the turbine nozzle separating a combustor of a power generation system from a turbine stage of the power generation system, wherein the first outlet is oriented substantially in opposition to the second outlet; a first injection conduit for delivering a carrier gas to the mixing zone through the first outlet; and a second injection conduit for delivering a fuel to the mixing zone through a second outlet; wherein the carrier gas and the fuel intermix within the mixing zone upon leaving the first injection conduit and the second injection conduit.

9 Claims, 9 Drawing Sheets

(51) Int. Cl.
*F01D 9/06* (2006.01)
*F02C 7/22* (2006.01)
*F23R 3/34* (2006.01)

(56) References Cited

U.S. PATENT DOCUMENTS

| | | | |
|---|---|---|---|
| 5,577,378 | A | 11/1996 | Althaus et al. |
| 6,079,197 | A | 6/2000 | Attia |
| 6,619,026 | B2 | 9/2003 | Carelli et al. |
| 6,691,503 | B2 | 2/2004 | Tiemann |
| 6,691,519 | B2 | 2/2004 | Little |
| 6,796,130 | B2 | 9/2004 | Little et al. |
| 6,817,187 | B2 | 11/2004 | Yu |
| 6,840,049 | B2 | 1/2005 | Ziegner |
| 6,981,358 | B2 | 1/2006 | Bellucci et al. |
| 7,040,097 | B2 | 5/2006 | Mukherjee |
| 7,603,863 | B2 * | 10/2009 | Widener ............... F23R 3/34 415/114 |
| 7,784,261 | B2 | 8/2010 | Little |
| 7,934,381 | B2 | 5/2011 | Eroglu et al. |
| 7,966,822 | B2 | 6/2011 | Myers et al. |
| 8,092,175 | B2 | 1/2012 | Beeck et al. |
| 8,112,216 | B2 | 2/2012 | Davis, Jr. et al. |
| 8,220,271 | B2 | 7/2012 | Poyyapakkam et al. |
| 8,322,121 | B1 | 12/2012 | Marcell |
| 8,511,059 | B2 | 8/2013 | Poyyapakkam et al. |
| 2008/0134685 | A1 | 6/2008 | Bunker et al. |
| 2008/0264033 | A1 | 10/2008 | Lacy et al. |
| 2009/0064654 | A1 | 3/2009 | Kirzhner et al. |
| 2009/0185903 | A1 * | 7/2009 | Beeck ............... F01D 5/145 416/91 |
| 2009/0277178 | A1 | 11/2009 | Carroni et al. |
| 2009/0277182 | A1 | 11/2009 | Engelbrecht et al. |
| 2009/0280443 | A1 | 11/2009 | Carroni et al. |
| 2009/0301054 | A1 | 12/2009 | Simpson et al. |
| 2010/0174466 | A1 | 7/2010 | Davis, Jr. et al. |
| 2011/0284669 | A1 | 11/2011 | Rathmann et al. |
| 2011/0314825 | A1 * | 12/2011 | Stryapunin ............ F02C 7/22 60/737 |
| 2012/0036824 | A1 | 2/2012 | Buss et al. |
| 2012/0055162 | A1 | 3/2012 | Eroglu et al. |
| 2012/0260622 | A1 | 10/2012 | Poyyapakkam et al. |
| 2012/0272659 | A1 | 11/2012 | Syed et al. |
| 2012/0297777 | A1 | 11/2012 | Poyyapakkam et al. |
| 2012/0297787 | A1 | 11/2012 | Poyyapakkam et al. |
| 2012/0328421 | A1 | 12/2012 | McMahan et al. |
| 2013/0306181 | A1 * | 11/2013 | Mitchell ............... F23L 15/04 137/888 |

FOREIGN PATENT DOCUMENTS

| | | |
|---|---|---|
| EP | 2211109 A1 | 7/2010 |
| EP | 2230455 A1 | 9/2010 |
| EP | 2295864 A1 | 3/2011 |
| EP | 2362147 A1 | 8/2011 |
| WO | 2010081612 A1 | 7/2010 |
| WO | 2011020695 A1 | 2/2011 |

OTHER PUBLICATIONS

U.S. Appl. No. 14/567,791, Final Office Action 1 dated Aug. 15, 2017, 22 pages.

U.S. Appl. No. 14/567,761, Final Office Action 1 dated Aug. 16, 2017, 18 pages.

U.S. Appl. No. 14/567,768, Office Action 1 dated Feb. 23, 2017, 26 pages.

U.S. Appl. No. 14/567,761, Office Action 1 dated Feb. 28, 2017, 30 pages.

U.S. Appl. No. 14/567,791, Office Action 1 dated Feb. 28, 2017, 33 pages.

U.S. Appl. No. 14/567,768, Office Action 2 dated Mar. 2, 2018, 9 pages.

U.S. Appl. No. 14/567,761, Office Action dated Mar. 7, 2018, 9 pages.

U.S. Appl. No. 14/567,791, Office Action dated Mar. 7, 2018, 9 pages.

* cited by examiner

INJECTION SYSTEMS FOR FUEL AND GAS

BACKGROUND OF THE INVENTION

The disclosure relates generally to injection systems for fuel and gas. More specifically, the disclosure relates to injector systems for introducing fuel and a carrier gas into components of a power generation system. The components can include, e.g., combustors and reheat combustors such as those used in a gas turbine system or other type of turbomachinery.

Turbine systems (also known as turbomachines) can generate power for, e.g., electric generators. A working fluid, such as hot gas or steam can flow across sets of turbine blades, which are coupled to a rotor of the turbine system. The force of the working fluid on the blades causes those blades (and the coupled body of the rotor) to rotate. In many cases, the rotor body is mechanically coupled to the drive shaft of a dynamoelectric machine such as an electric generator. In this sense, initiating rotation of the turbine system rotor can also rotate the drive shaft in the electric generator to and an electrical current to generate a particular power output.

To generate the working fluid in a combustion-based turbomachine, a fuel or other reactant can combust in the presence of air to generate a hot gas stream for imparting work, i.e., actuating the blades of the turbine system. Some combustors apply the principle of autoignition to combust the fuel in the presence of air in the combustor. Autoignition refers to the intermixing of fuel and air in a high-temperature reaction chamber, where the fuel and air can combust inside the chamber without a flame being needed to activate the reaction. In conventional systems, the fuel is added to a flow of air of a turbomachine in a mixing duct preceding the chamber by a particular distance. Fuel and air can mix in the mixing duct before reaching the chamber, where combustion reactions occur by autoignition.

BRIEF DESCRIPTION OF THE INVENTION

Embodiments of the present disclosure relate generally to injection systems for fuel and gas. In particular, injection systems according to the present disclosure provide systems for mixing fuel, air, and/or inert gases in different ways and to create differing amounts of residence time, both for mixing before the oxygen and fuel combust, and to complete reactions before the mixture exits the combustion chamber.

A first aspect of the present disclosure provides an injection system, including: a mixing zone embedded within a surface of a turbine nozzle and positioned between a first outlet and a second outlet, the turbine nozzle separating a combustor of a power generation system from a turbine stage of the power generation system, wherein the first outlet is oriented substantially in opposition to the second outlet; a first injection conduit for delivering a carrier gas to the mixing zone through the first outlet; and a second injection conduit for delivering a fuel to the mixing zone through a second outlet; wherein the carrier gas and the fuel intermix within the mixing zone upon leaving the first injection conduit and the second injection conduit.

A second aspect of the present disclosure provides an injection system, including: at least one first injection conduit for delivering a fuel to a surface of a turbine nozzle through a first outlet, the turbine nozzle separating a combustor of a power generation system from a turbine stage of the power generation system; a second injection conduit for delivering a carrier gas to the surface of the turbine nozzle through a second outlet, the at least one first injection conduit being positioned within the second injection conduit; and at least one barrier positioned between the second injection conduit and the at least one first injection conduit, wherein the at least one barrier separates the fuel in the at least one first injection conduit from the carrier gas of the second injection conduit.

A third aspect of the present disclosure provides an injection system, including: at least one first injection conduit for delivering one of a fuel and a carrier gas to a surface of a turbine nozzle through a first outlet, the turbine nozzle separating a combustor of a power generation system from a turbine stage of the power generation system; and at least two second injection conduits for delivering the other of the fuel and the carrier gas to the surface of the turbine nozzle through a respective plurality of second outlets, the plurality of second injection conduits being adjacent to the first injection conduit; wherein a linear arrangement of the at least one first injection conduit and the at least two second injection conduits forms an alternating sequence of outlets for the fuel and the carrier gas.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally to injection systems for one or both of a carrier gas and a combustible fuel into a power generation system. In an example embodiment, injection systems according to the present disclosure can inject fuel and carrier gas into a reaction chamber of a gas turbine system. One type of reaction chamber in a gas turbine system can include the reaction chamber of a reheat combustor. The present disclosure describes several injection systems for injecting the fuel and carrier gas, which may be positioned at one or more particular locations of a turbine nozzle separating a reaction chamber from a turbine stage. Using different relative positions and orientations of a first outlet for one medium and a second outlet for a different medium, different types of post-injection mixing can be achieved within the injection system and/or reaction chamber.

Spatially relative terms, such as "inner," "outer," "beneath," "below," "lower," "above," "upper," "inlet," "outlet," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
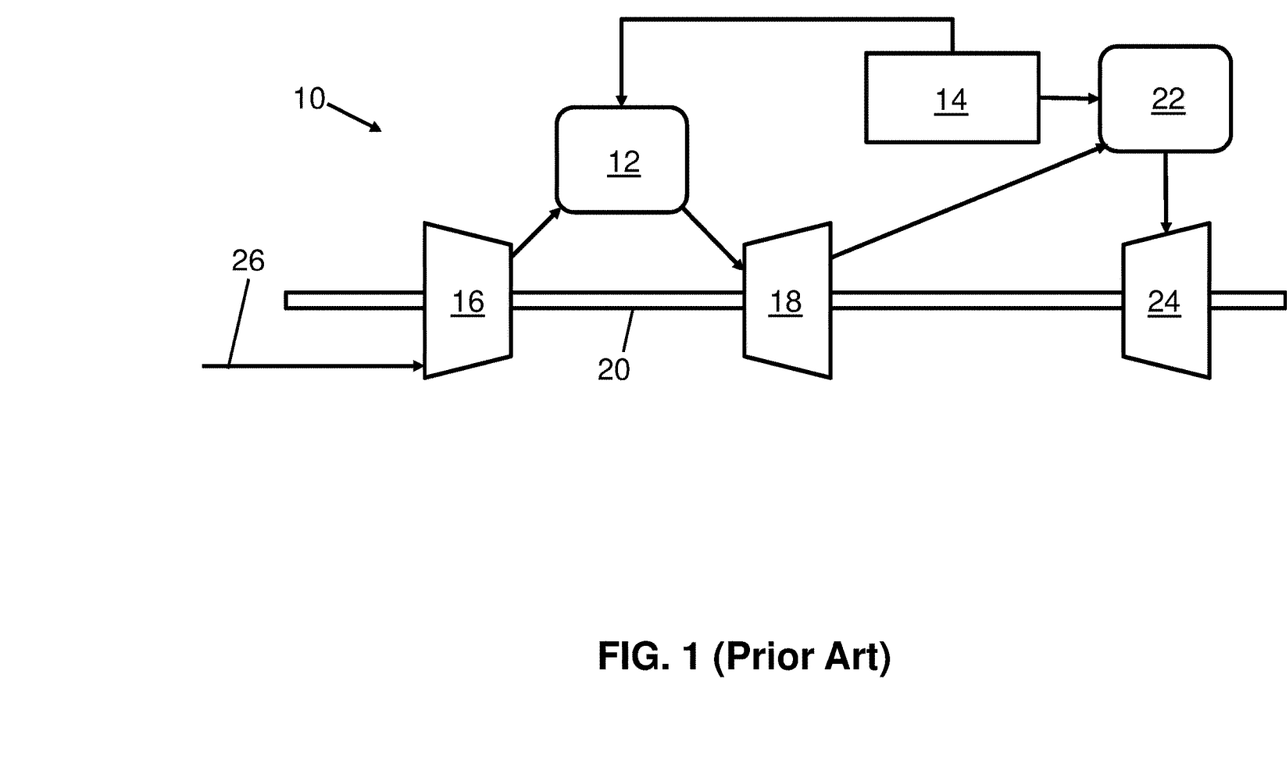
FIG. 1 is a schematic view of a gas turbine system which includes a reheat combustor.

Referring to FIG. 1, a conventional power generation system 10 in the form of a turbomachine is shown. Embodiments of the present disclosure can be adapted for use with power generation system 10 and/or can be integrated into components thereof. Power generation system 10 is shown by example as being a combustion-based turbomachine assembly, though embodiments of the present disclosure can also be adapted for use with other types of combustion systems where applicable. In the setting of combustion-based turbomachines, a combustor 12, connected to a fuel supply 14, is typically located between a compressor 16 and a high pressure (HP) gas turbine 18 of power generation system 10. Fuel supply 14 can be fluidly connected to or otherwise in the form of one or more fuel nozzles coupled to combustor 12. In an embodiment, fuel supply 14 can be fluidly connected to a group of fuel nozzles positioned circumferentially about combustor 12 and/or other combustors of power generation system 10. Compressor 16 and HP gas turbine 18 can be mechanically coupled to each other through a rotatable shaft 20. To increase power output and/or efficiency, power generation system 10 can also include a reheat combustor 22 and a low pressure (LP) gas turbine 24 in fluid communication with the fluids output from HP gas turbine 18.

Air 26 flows sequentially through compressor 16, combustor 12, HP gas turbine 18, reheat combustor 22, and LP gas turbine 24. The compression provided from compressor 16 can also increase the temperature of air 26. Fuel supply 14 can provide fuel to combustor 12 and reheat combustor 22, which combusts in the presence of air 26 to yield a hot gas stream. The hot gas stream from combustor 12 can enter HP gas turbine 18 to impart mechanical energy to rotatable shaft 20, e.g., by rotating a group of turbine buckets, thereby delivering power back to compressor 16 and/or any loads (not shown) mechanically coupled to rotatable shaft 20. Similarly, fuel provided from fuel supply 14 to reheat combustor 22 can combust in the presence of excess air delivered from gas turbine 18 to yield a hot gas stream to LP gas turbine 24, which can impart additional mechanical energy to rotatable shaft 20, e.g., by rotating turbine buckets within LP gas turbine 24. Power generation system 10 may be one of several individual turbomachines controlled via the same operator and/or may be part of a larger power generation system.

Figure 2:
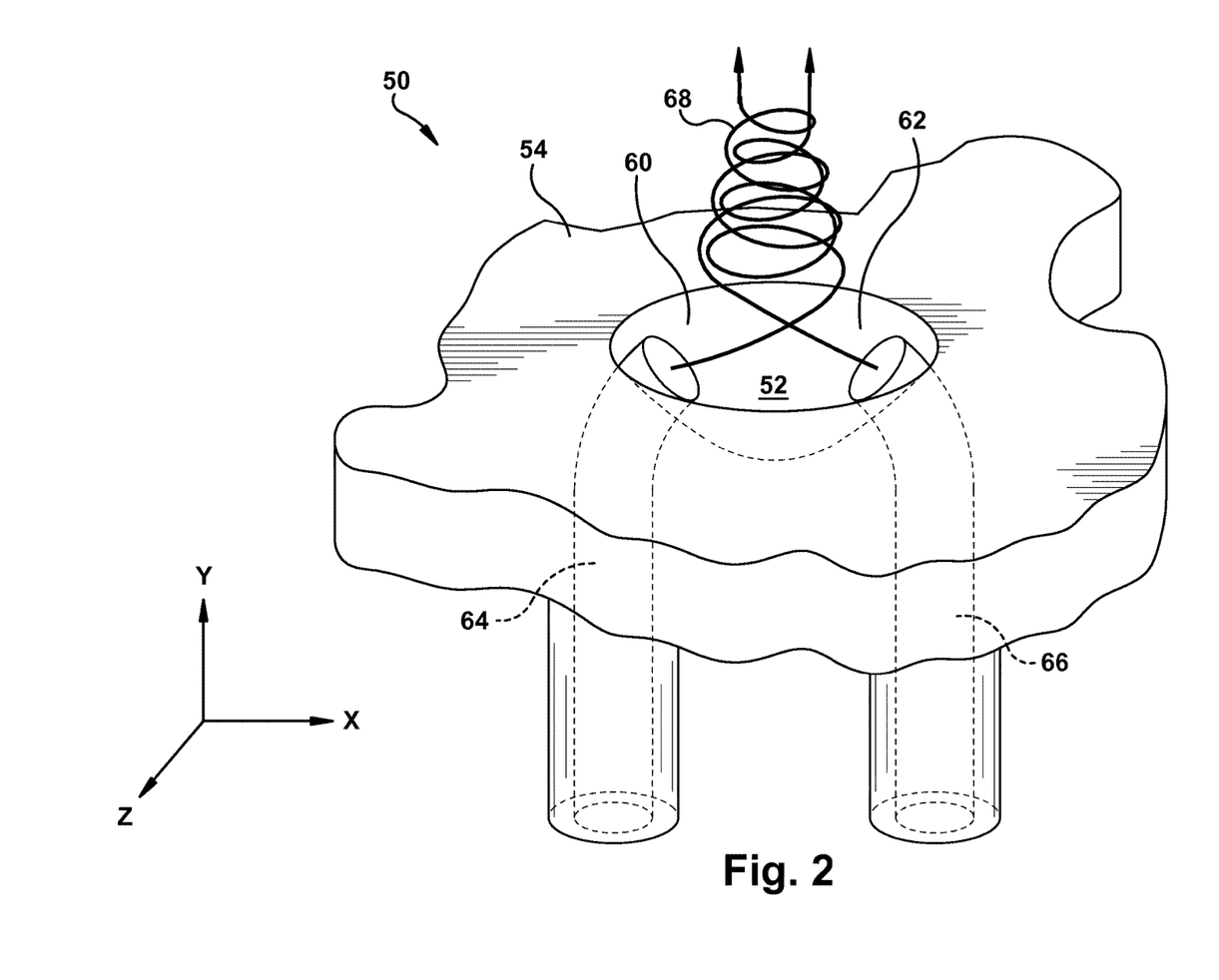
FIGS. 2-4 are perspective partial views of an injection system for fuel and carrier gas according to an embodiment of the present disclosure.

Turning to FIG. 2, an injection system 50 according to the present disclosure is shown. Injection system 50 can include a mixing zone 52 embedded within the surface of a turbine nozzle 54. Turbine nozzle 54 can separate a combustor (e.g., combustor 12 (FIG. 1) or reheat combustor 22 (FIG. 1)) from a turbine stage (e.g., HP turbine 18 (FIG. 1) or LP turbine 26 (FIG. 1)) of a system, such as power generation system 10 (FIG. 1). In the example of a gas turbine system, turbine nozzle 54 can separate reheat combustor 22 from LP turbine 24 of power generation system 10. Here, turbine nozzle 54 can be exposed to a flow of fluid through reheat combustor 22.

Mixing zone 52 can be positioned between a first outlet 60 and a second outlet 62. First outlet 60 can be in the form of one or more holes, orifices, channels, nozzles, etc. for communicating a carrier gas (e.g., a combustible gas including oxygen or an inert gas) in a first injection conduit 64 into mixing zone 52. The carrier gas communicated to mixing zone 52 from first outlet 60 can be excess cooling air routed from a compressor (e.g., compressor 16 (FIG. 1)), or can be delivered from an independent supply of air or another gas located, e.g., external to power generation system 10. Second outlet 62 can be in the form of one or more holes, orifices, channels, nozzles, etc. for communicating a fuel in second injection conduit 66 into mixing zone 52. The fuel communicated to mixing zone 52 through second outlet 62 can be delivered from, e.g., fuel supply (FIG. 1), or other sources which may receive and/or yield unreacted fuel. The carrier gas may be an oxidizing gas, e.g., air; it may be an inert gas, or it may be a mixture of any chemical composition suitable for the purpose of enhancing the mixing and reacting of a fuel and controlling the residence time of the fuel both before and after ignition occurs. In any event, the fuel and carrier gas communicated to mixing zone 52 can intermix with each other therein to become a reactive gas mixture 68.

To increase the intermixing of fuel and gas in mixing zone 52, first outlet 60 and second outlet 62 can be oriented substantially "in opposition" to each other. In the most general sense, "in opposition" encompasses all orientations in which at least some fuel and at least some carrier gas from first outlet 60 and second outlet 62 will collide with each other within mixing zone 52 before leaving mixing zone 52 as a reactive gas mixture 68. In one embodiment, first outlet 60 and second outlet 62 can be directly opposed along a particular linear direction, i.e., having opposite or substantially opposite orientations (i.e., within a margin of error of approximately five degrees), such that the angular orientation of first outlet 60 and second outlet 62 relative to a horizontal axis (e.g., axis "X" of FIG. 2) differ by approximately 180°. The oppositional orientation of first outlet 60 to second outlet 62 can be enhanced by forming a dimple or recess in the surface of turbine nozzle 54, and locating first and second outlets 60, 62 within this dimple. In another embodiment, first or second outlet 60, 62 can be directed into the flow of the other of first or second outlet 60, 62, e.g., with one fluid flow component vector in the same direction as the other outlet along one axis, with another component vector in a different direction from the other outlet along a different axis. For example, first or second outlet 60, 62 can be oriented in a direction substantially perpendicular to the surface of turbine nozzle 54, while the other outlet can be oriented at an angle from the surface of turbine nozzle 54 which differs from the other outlet by an angular difference of less than approximately 45°. In the example of FIG. 2, first outlet 60 and 62 are substantially in opposition to each other, and communicate fluid flow along with a positive "Y" direction component vector but with "X" direction component vectors in opposing directions and facing towards each other. Any number of possible relative orientations between first outlet 60 and second outlet 62 are contemplated in embodiments of the present disclosure, so long as at least a portion of the carrier gas exiting first outlet 60 collides with and/or intermixes with at least a portion of the fuel exiting second outlet 62 during operation.

Figure 3:
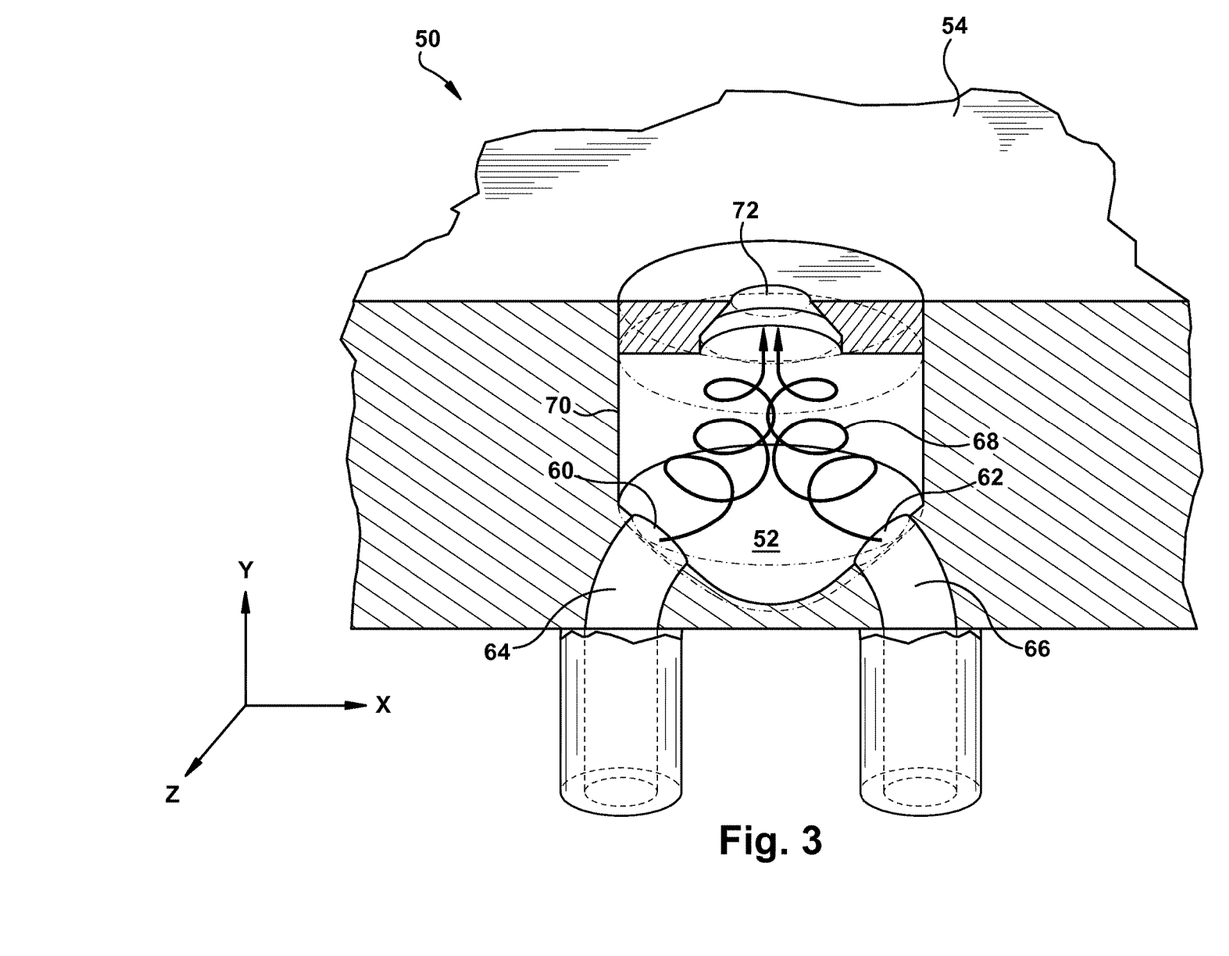

Turning to FIG. 3, injection system 50 is shown with additional components included. Injection system 50 can include a mixing chamber 70 embedded within the surface of turbine nozzle 54 to enclose mixing zone 52 therein. Mixing chamber 70 can also include a discharge passage 72 extending through mixing chamber 70 between mixing zone 52 and an exterior of the mixing chamber. Mixing chamber 70, along with the substantially opposing orientations of first outlet 60 and second outlet 62, can increase the amount of contact between the carrier gas and fuel from first and second injection conduits 64, 66 before leaving mixing zone 52 through discharge passage 72. Here, first and second outlets 60, 62, may be oriented with opposing "X" direction component vectors and can be positioned in different Y-Z planes (i.e., positioned at different coordinates along axis "X"). In this case, first and second outlets 60, 62 can communicate fluid flows of carrier gas and fuel in mixing zone 52 which flow in a substantially clockwise or counterclockwise direction within mixing chamber 70 before combining therein and passing through discharge passage 72.

As is further shown in FIG. 3, discharge passage 72 can be contoured with a particular geometry to permit fluid communication in one direction while impeding fluid communication in the other direction. For example, discharge passage 72 can be substantially frusto-conical, with a cross section of discharge passage 72 being greater at one end than at its opposing end. Discharge passage 72 can additionally or alternatively be machined to include other geometries, e.g., a labyrinthine shape, a tapered shape, etc. In any case, the fluid flow rate of carrier gas and fuel within mixing zone 52 towards discharge passage 72 can be substantially greater than the fluid flow rate of substances outside mixing chamber 70 (e.g., within a reaction chamber) into discharge passage 72. Thus, particular contours of discharge passage 72 can prevent fluid communication of combusted gasses outside of turbine nozzle 54 from entering mixing zone 52 through discharge passage 72. In other embodiments, where the risk of combusted gasses entering mixing zone 52 is low, discharge passage 72 can have any other desired geometry, e.g., substantially cylindrical, a parallelepiped-shaped passage with a rectangular cross-section, etc.

Injection system 50 may serve other functions in addition to providing intermixed reactive gas to a component of power generation system 10 (FIG. 1). For example, injection system 50 may provide cooling to turbine nozzle 54. In an embodiment, either or both of first and second injection conduits 64, 66 can be composed of a thermally conductive material. Thermally conductive materials can include, e.g. metal compositions such as alloys, thermally conductive plastics and/or organic materials, conductive ceramic materials, etc. In any case, the material compositions of first and second injection conduits 64, 66 with conductive properties can allow a respective fluid (e.g., carrier gas or fuel) in first and second injection conduits 64, 66 to absorb heat from the surface of turbine nozzle 54. In this case, heat transferred to turbine nozzle 54 during a combustion reaction can be partially dissipated by being transferred to carrier gas or fuel in first and/or second injection conduits 64, 66 to reduce the amount of damage to turbine nozzle 54.

Figure 4:
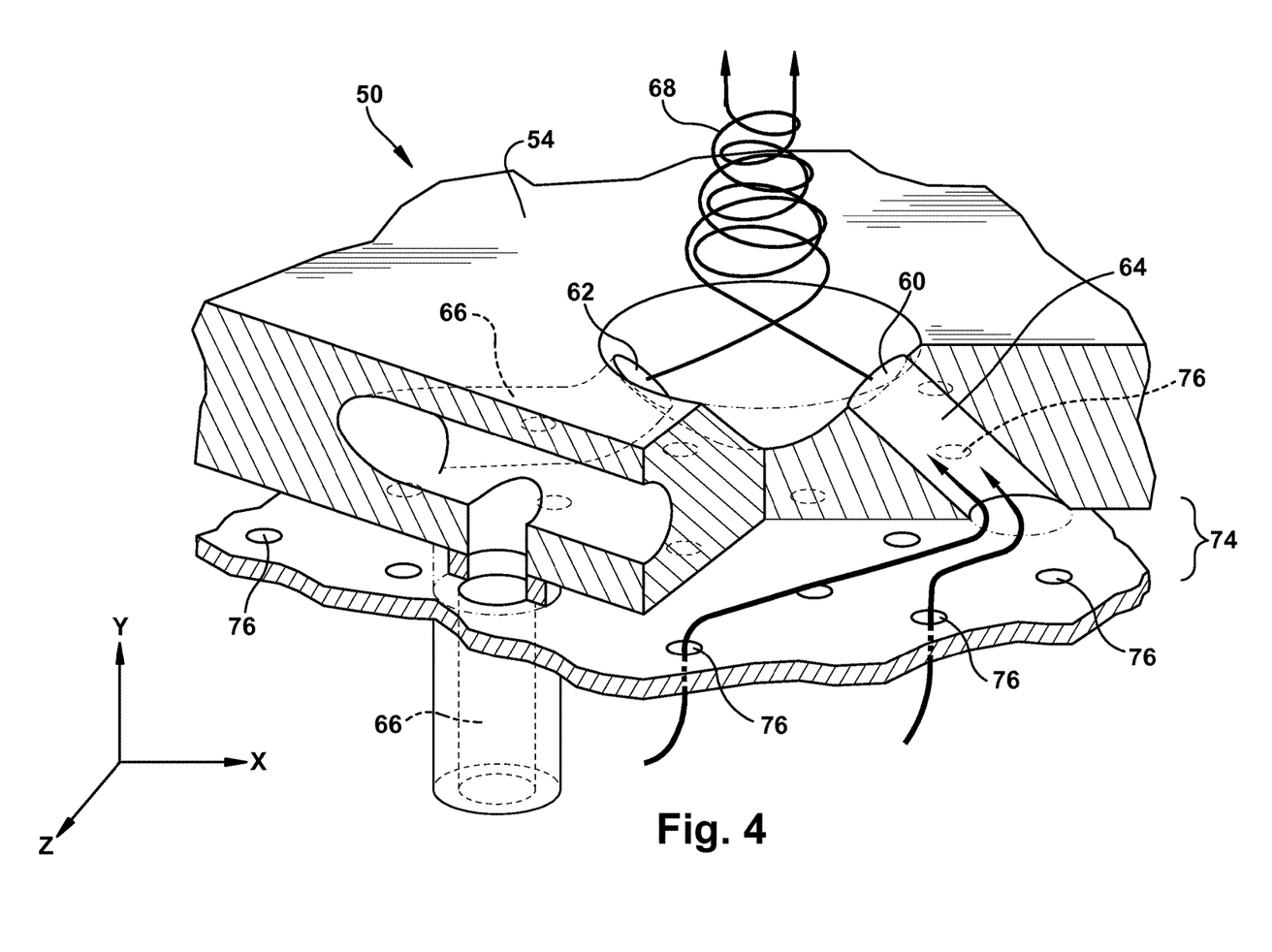

Turning to FIG. 4, injection system 50 is shown as coupled to and/or including additional components of turbine nozzle 54. Here, second injection conduit 64 can be in fluid communication with a manifold 74 for collecting carrier gas from multiple carrier gas feed conduits 76. Carrier gas feed conduits 76 may each be in fluid communication with a single source of carrier gas or different sources of carrier gas. As shown in FIG. 4, manifold 74 can be composed of several layers with holes, orifices, passages, etc. fluidly connecting the various layers to one first injection conduit 64. At least one of the various layers in manifold 74 can include one of the several carrier gas feed conduits 76 connecting to a source of carrier gas. Manifold 74 can combine carrier gas from multiple sources together, to be provided to first injection conduit 64. As is also shown in FIG. 4, second injection conduit 66 can extend through manifold 74, such that second injection conduit 66 is fluidly isolated from carrier gas in manifold 74. In this arrangement, where first injection conduit 66 is composed of a thermally conductive material, manifold 74 can cool a greater surface area of turbine nozzle 54 than is occupied by mixing zone 52, and the fuel in second injection conduit 66 can also absorb heat from turbine nozzle 54 to provide additional cooling.

Figure 5:
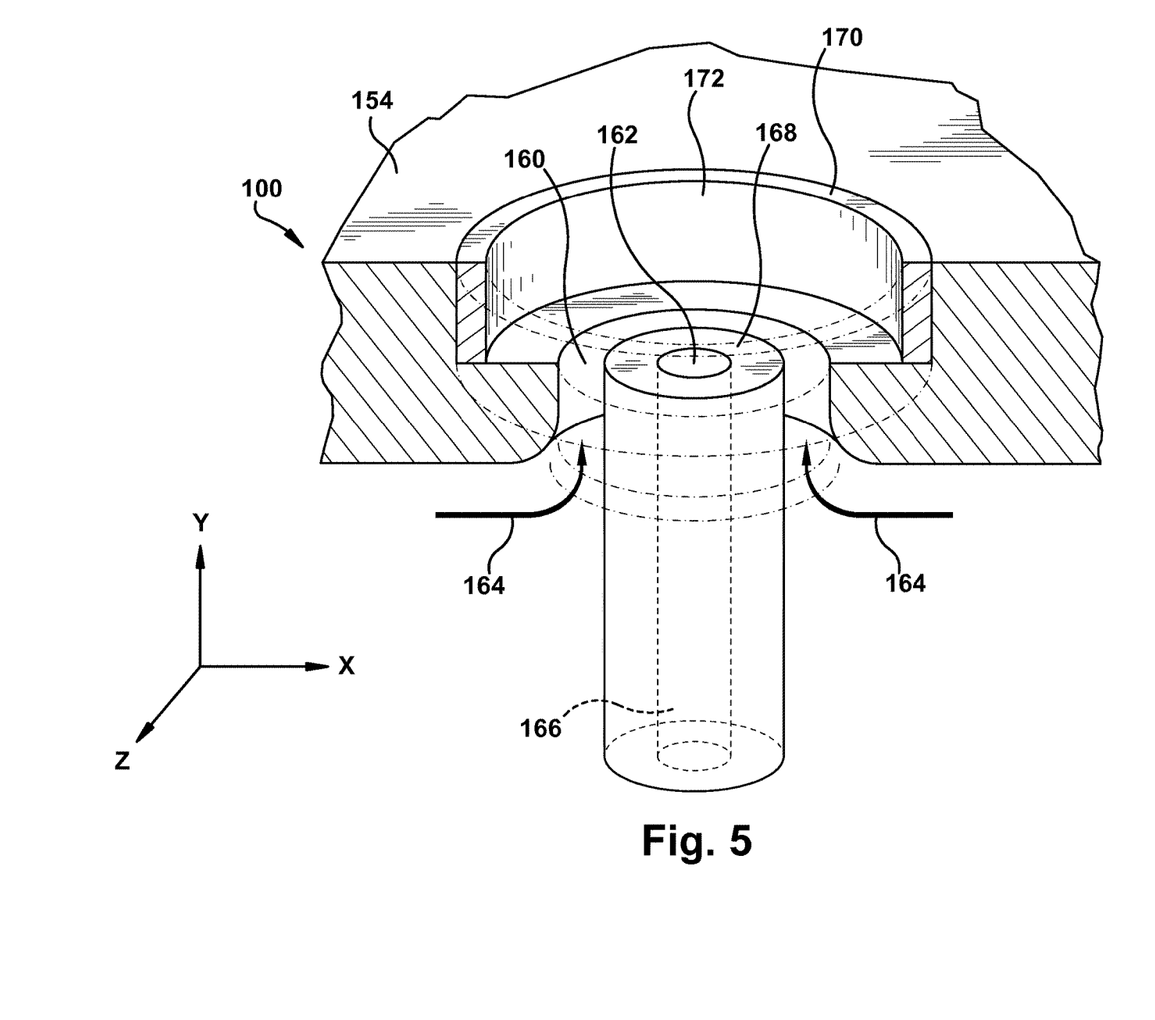
FIGS. 5-6 are perspective partial views of another injection system for fuel and carrier gas according to another embodiment of the present disclosure.

Turning now to FIG. 5, an injection system 100 according to another embodiment of the present disclosure is shown. Injection system 100 can include a first outlet 160 for delivering a carrier gas and at least one second outlet 162 for delivering a fuel to the surface of turbine nozzle 154. A first injection conduit 164 can deliver cooling air (as a carrier gas) to the surface of turbine nozzle 154 through first outlet 160. At least one second injection conduit 166 can deliver fuel to the surface of turbine nozzle 154 through second outlet 162. Furthermore, second injection conduit 166 can be positioned within first injection conduit 164. A barrier 168 can be positioned between first injection conduit 164 and second injection conduit(s) 166. Barrier 168 can separate the carrier gas in first injection conduit 164 from the fuel of second injection conduit 166. As stated elsewhere herein, turbine nozzle 154 can separate a combustor (e.g., combustor 12 (FIG. 1) or reheat combustor 22 (FIG. 1)) from a turbine stage (e.g., HP turbine 18 (FIG. 1) or LP turbine 26 (FIG. 1)) of a system, such as power generation system 10 (FIG. 1). In an example embodiment, turbine nozzle 154 can separate reheat combustor 22 from LP turbine 24 of power generation system 10 in the form of a gas turbine system, and can be exposed to a flow of fluid through reheat combustor 22.

Injection system 100 can also include a mixing chamber 170 positioned within the surface of turbine nozzle 154. Mixing chamber 170 can also include a discharge passage 172 positioned above first and second outlets 160, 162 to provide fluid communication between the interior and exterior of mixing chamber 170. Mixing chamber 170 can provide a region of intermixing between carrier gas and fuel exiting first and second injection conduits 164, 166 through first and second outlets 160, 162. Discharge passage 172 can be directly aligned and/or positioned coaxial with first and/or second outlets 160, 162 as is shown in FIG. 5. Alternatively, discharge passage 172 may be aligned with a different axis from first and/or second outlets 160, 162. In yet another embodiment, discharge passage 172 may be in the form of multiple discharge passages 172 extending through mixing chamber 170.

Embodiments of injection system 100 can include varying relative positions of first injection conduit 164 and second injection conduit 166, with other components being positioned therebetween or otherwise included where applicable. For example, second injection conduit 166 can be positioned within first injection conduit 164. As is shown in FIG. 5, first and second outlets 160, 162 can have a coaxial arrangement with barrier 168 being in the form of a substantially circular division between the two outlets. Barrier 168 can make up part of first and/or second injection conduits 164, 166, or can be a completely different structure. First injection conduit 164 can split or diverge within turbine nozzle 154, and may be composed of a thermally conductive material, e.g., one of the thermally conductive materials discussed elsewhere herein with respect to first injection conduit 64 (FIGS. 2-4). Where first injection conduit 164 is composed of a thermally conductive material, carrier gas in first injection conduit 164 can be collected from multiple sources in fluid communication with first injection conduit 164 such that the carrier gas can absorb heat from a larger surface area of turbine nozzle 154 through its thermally conductive composition. Second injection conduit 166 can extend substantially perpendicularly into turbine nozzle 154 relative to the surface thereof to connect second outlet 162 to a particular fuel source. Second injection conduit 166 may also be composed of a thermally conductive material. The use of a thermally conductive material in the composition of second injection conduit 166 and/or barrier 168 can allow heat to be transferred between fuel in second injection conduit 166 and carrier gas in first injection conduit 164 through barrier 168.

Figure 6:
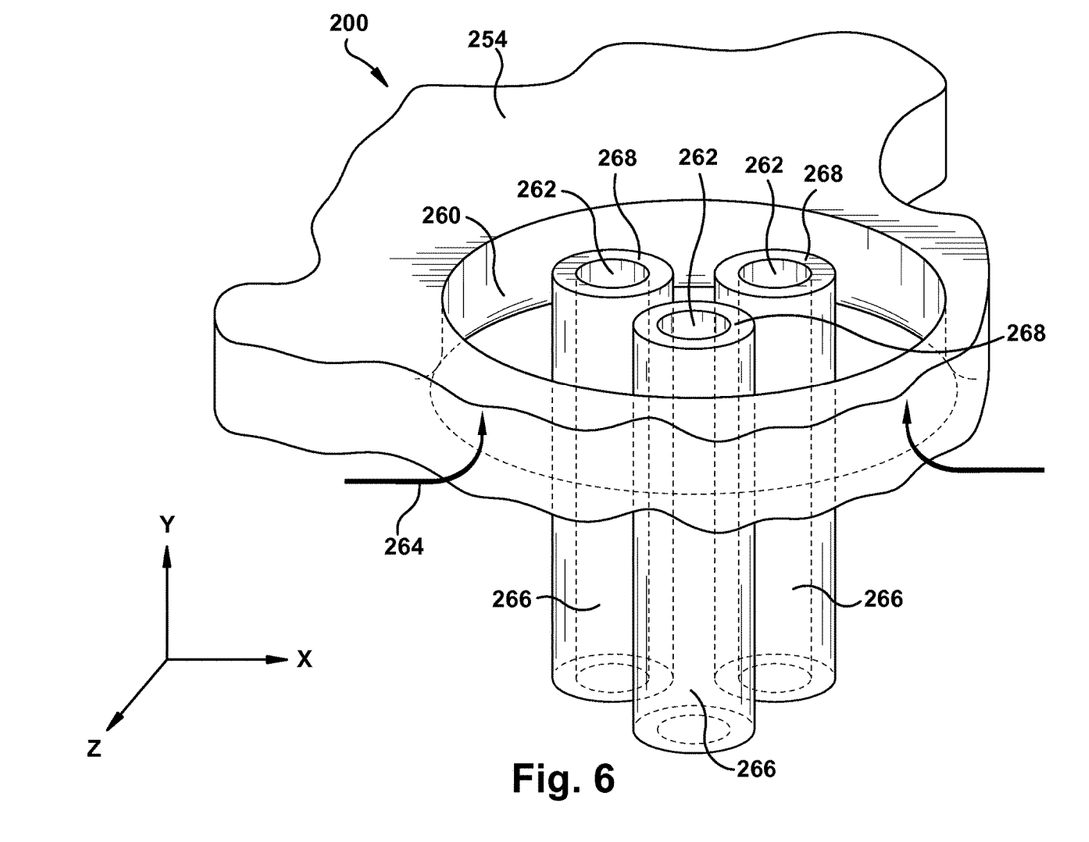

Turning to FIG. 6, an injection system 200 with a different arrangement of first and second injection conduits 264, 266 is shown. Injection system 200 can include a plurality of second injection conduits 266, each of which may be positioned within first injection conduit 264. Here, some second injection conduits 266 may not be coaxial with first injection conduit 264, and can be distributed throughout the cross sectional area of first injection conduit 264 uniformly or non-uniformly. Several second outlets 262 can communicate fuel beyond the surface of a turbine nozzle 254, where fuel can intermix with cooling air (as a carrier gas) from first injection conduit 264 delivered to the surface of turbine nozzle 254 through first outlet 260. A plurality of barriers 268 can be positioned between first injection conduit 264 and one of the plurality of second injection conduits 266 to separate carrier gas within first injection conduit 264 from fuel in the second injection conduits 266. The number and size of second injection conduits 266 within first injection conduit 264 can vary based on intended application, reaction conditions, etc., to control both the amount of intermixing between fuel and air upon injection, the level of additional combustion provided with injection system 200, and other reaction characteristics. Although mixing chamber 170 (FIG. 5) and discharge passage 172 (FIG. 5) are omitted from FIG. 6 as an example, it is understood that these components can also be used, with or without accompanying modifications, in embodiments where multiple second injection conduits 266 are used.

Figure 7:
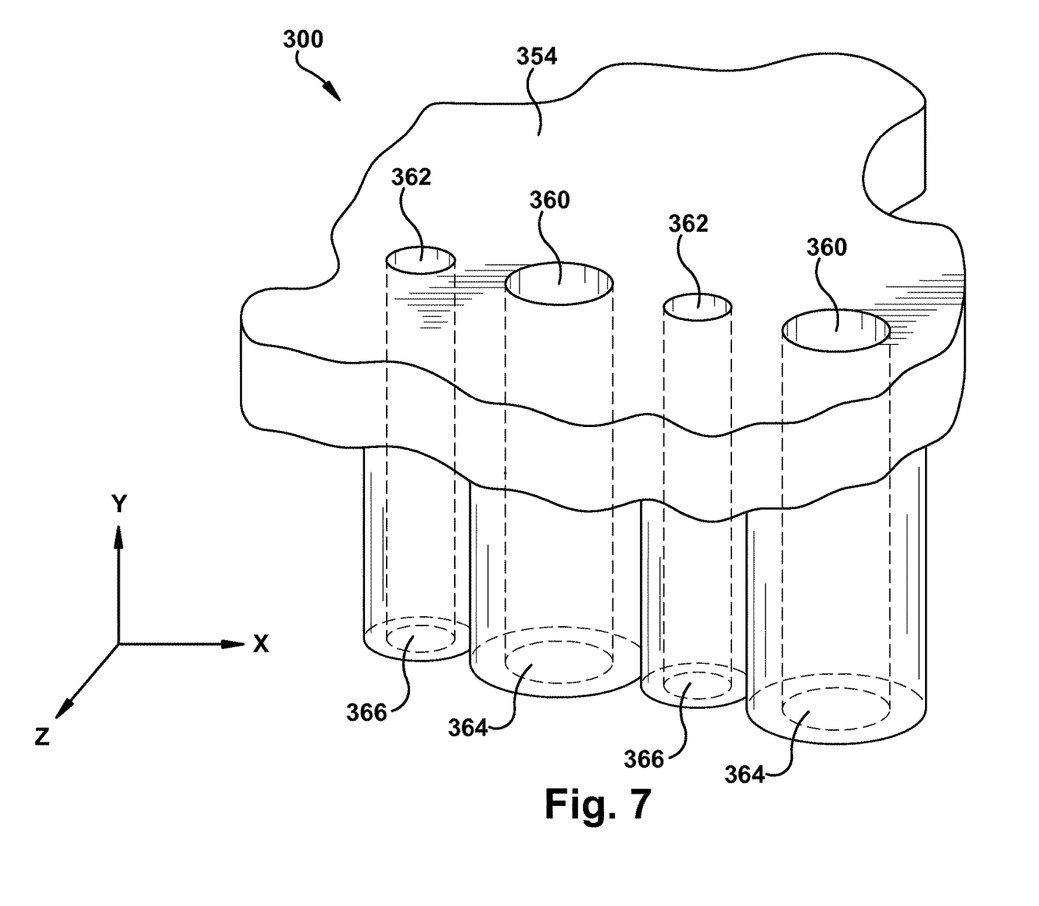
FIGS. 7-8 are perspective partial views of yet another injection system for fuel and carrier gas according to a different embodiment of the present disclosure.

Turning to FIG. 7, another injection system 300 according to a different embodiment of the present disclosure is shown. Injection system 300 may include an arrangement of injection conduits particularly suitable for, e.g., situations where longer delays before post-injection intermixing of oxygen and fuel are desired. As is shown in FIG. 7, injection system 300 can include at least one first outlet 360 fluidly connected to a corresponding first injection conduit 364 for delivering either fuel or air to a surface of turbine nozzle 354. Similarly, at least one second outlet 362 can provide fluid communication between a surface of turbine nozzle 354 and at least one second injection conduit 366. Second outlet 362 and second injection conduit 366 can deliver a different fluid to the surface of turbine nozzle 354 from what is delivered through first outlet 360 and first injection conduit 364. For example, where first injection conduit 364 delivers carrier gas to turbine nozzle 354, second injection conduit 366 can deliver fuel to the surface of turbine nozzle 354. First injection conduit 362 may be in fluid communication with a supply of carrier gas (e.g., cooling air) from a compressor of a power generation system, or in an alternative embodiment can be fluidly connected to a dedicated supply of carrier gas located, e.g., within or external to power generation system 10 (FIG. 1).

First and second outlets 360, 362 can have varying sizes relative to each other, and in some embodiments can be of approximately equal surface area to deliver substantially similar flows of fluid to the surface of turbine nozzle 354. Injection system 300 can include at least two second injection conduits 366 positioned adjacent to first injection conduit 364, such that the first and second injection conduits 364, 366 and first and second outlets 360, 362 form an alternating linear sequence of outlets across the surface of turbine nozzle 354. The alternating linear sequence can prevent two first outlets 360 and/or two second outlets 362 from being positioned next to each other and causing an amount of fuel or air from intermixing with a disproportionately large or small amount of the other medium. The example embodiment shown in FIG. 7 and discussed herein is a generalized form of injection system 200, and other embodiments with different shapes retaining the alternating linear sequence of first and second outlets 360, 362 and/or first and second injection conduits 364, 366 are contemplated and discussed herein. Each first outlet 360 and each second outlet 362 can be substantially coplanar with each other (e.g., within the same X-Y plane as is shown in FIG. 7) to create a particular type and amount of mixing between fuel and carrier gas after both mediums exit turbine nozzle 354 through their respective outlets.

The alternating sequence of first and second outlets 360, 362 can create a particular type of shape or pattern. For example, as shown in FIG. 7, the plurality of first and second outlets 360, 362 and/or first and second injection conduits 364, 366 can create a linear, row-shaped pattern. This pattern can be particularly effective for certain regions of turbine nozzle 354. For instance, a flow of fluid across turbine nozzle 354 can have a direction of travel substantially parallel to the direction of row-shaped alternating pattern of first and second injection conduits 364, 366 and/or first and second outlets 360, 362. First and second outlets 360, 362 can be located on one of a "leading edge" or a "trailing edge" of turbine nozzle 354. A leading edge generally refers to an edge of turbine nozzle 354 across which fluid flows from a reaction chamber, and a trailing edge generally refers to an edge of turbine nozzle 354 across which fluid flows, and preceding a turbine stage of a power generation system. Examples of leading and trailing edges of turbine nozzle 354 are discussed elsewhere herein.

Figure 8:
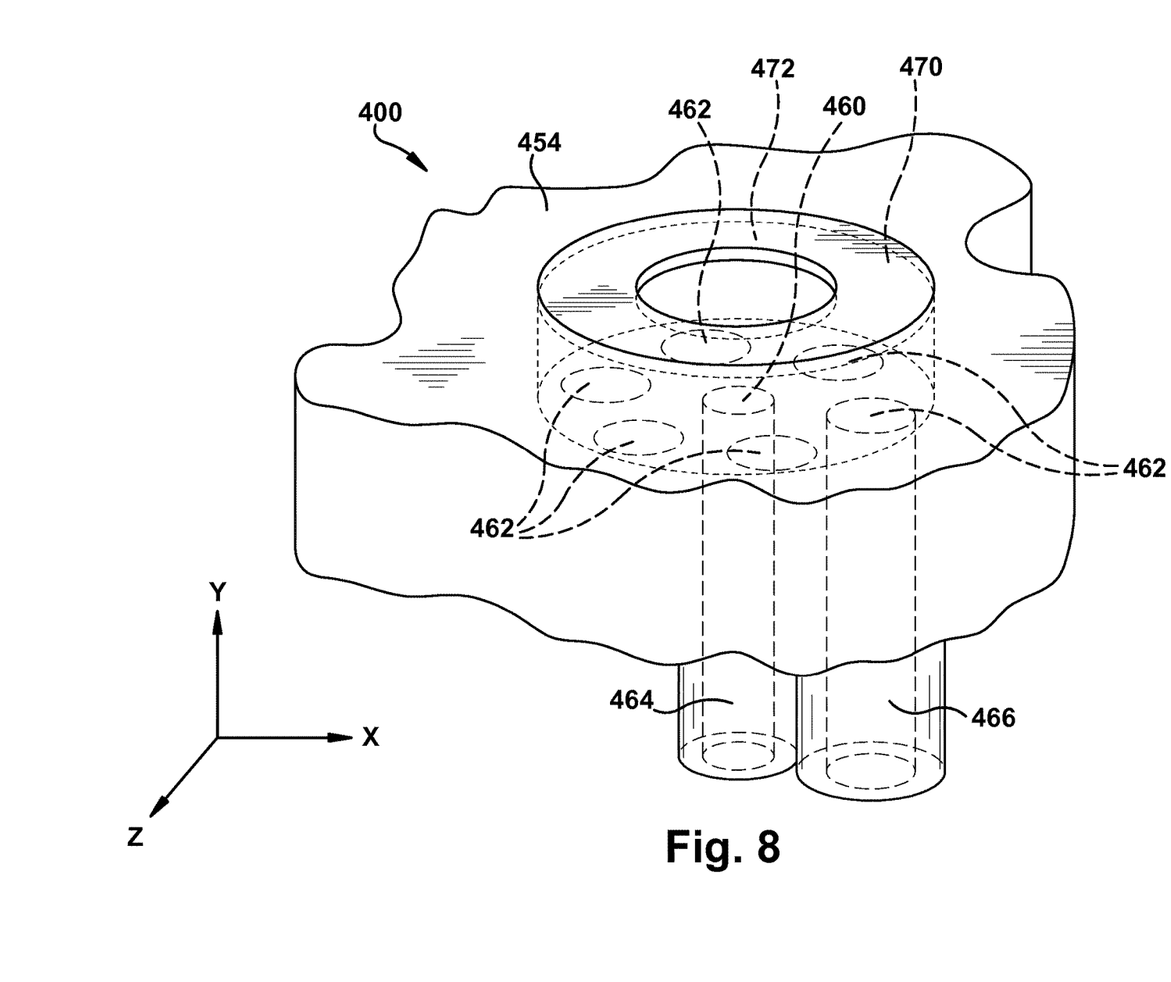

Turning to FIG. 8, an injection system 400 is shown with a different arrangement of components. Injection system 400 can include a group of second outlets 462 positioned substantially circularly about at least one first outlet 460. This particular pattern can maintain the alternating linear sequence of first and second outlets 460, 462, e.g., from one second outlet 462 to first outlet 460 and to another second outlet 462 positioned at an opposite side of the substantially circular arrangement. Though the type of outlet may alternate along a particular linear direction, second outlets 462 may be in a substantially circular pattern with first outlet 460 being located at or close to the center of injection system 400. First and second outlets 460, 462 can be fluidly connected to first and second injection conduits 464, 466.

As is also shown in FIG. 8, injection system 400 can include a mixing chamber 470 which defines a mixing zone therein. The mixing zone can generally include space within mixing chamber 470 above the surface of a turbine nozzle 454. Carrier gas and fuel from first and second outlets 460, 462 with the alternating arrangement can intermix within the mixing zone (i.e., within mixing chamber 470). The intermixed carrier gas and fuel can flow away from the surface of turbine nozzle 454 through a discharge passage 472 extending through mixing chamber 470. The addition of mixing chamber 470 and discharge passage 472 to create a mixing zone above alternating first and second outlets 460, 462 can increase the extent to which carrier gas and fuel can mix before entering and being combusted within a reaction zone.

Figure 9:
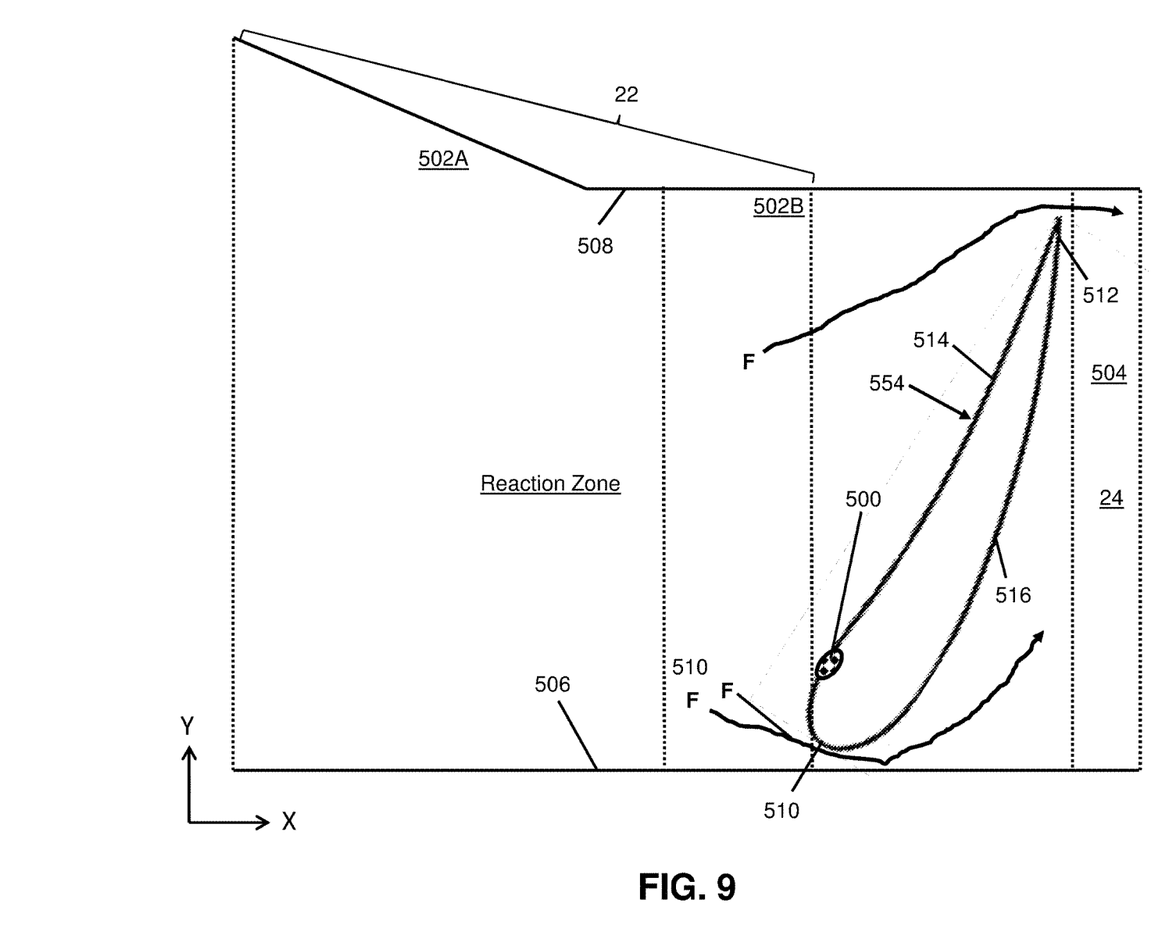
FIG. 9 is a cross-sectional view of a turbine nozzle between a combustor and turbine section according to embodiments of the present disclosure.

Turning to FIG. 9, a cross-section of turbine nozzle 554 with various possible locations for injection systems 50 (FIGS. 2-4), 100 (FIG. 5), 200 (FIG. 6), 300, (FIG. 7), 400 (FIG. 8) is shown. Although turbine nozzle 554 is shown by way of example in FIG. 9, other types of turbine nozzles discussed herein, e.g., turbine nozzle 54 (FIGS. 2-4), turbine nozzle 154 (FIG. 5), turbine nozzle 254 (FIG. 6), turbine nozzle 354 (FIG. 7), and/or turbine nozzle 454 (FIG. 8), can also be used where applicable. The locations on turbine nozzle 554 identified in FIG. 9 and discussed herein are provided as examples and not intended to limit possible locations for a particular injection system. The placement of injection system(s) 50, 100, 200, 300, 400 can vary based on intended use and the type of power generation system in which the injection system(s) is/are used. Turbine nozzle 554 can be positioned between reheat combustor 22 and LP (low pressure) turbine 24 of a particular power generation system.

As shown in the cross-sectional view in plane X-Y of FIG. 9, turbine nozzle 554 can be positioned downstream of reheat combustor 22, upstream of LP turbine 24, and between an inner sidewall 506 and an outer sidewall 508. Corresponding fluid flows F can pass turbine nozzle 554 while traveling from reheat combustor 22 to LP turbine 24. Injection system(s) 50, 100, 200, 300, 400 can be positioned at a location exposed to fluid flow F from a reaction zone positioned within a reaction chamber 502A and an aft section 502B of reheat combustor 22. Thus, injection system(s) 50, 100, 200, 300, 400 may be positioned on one or more locations of turbine nozzle 554, such as leading edge 510 or trailing edge 512, so named because of their locations relative to the flow of fluid F from reaction chamber 502A and aft section 502B to turbine stage 504. Flows of intermixed carrier gas and fuel (C) may enter reaction zone from injector system 500 to combust within the reaction zone before flowing past nozzle 554, as shown. Injector system 500 represents the placement of injector of systems 50, 100, 200, 300, 400. In addition or alternatively, injection system(s) 50, 100, 200, 300, 400 can be positioned on or proximal to pressure side 514 and/or suction side 516 of turbine nozzle 554. Pressure side 514 and suction side 516 can be identified as such based on the positive or negative resultant pressures from fluids flowing proximal to their locations. Turbine nozzle 554 can include a single embodiment of injection system 50, 100, 200, 300, 400, or can include multiple embodiments of injection system(s) 50, 100, 200, 300, 400 described herein, as may be desired or necessary for differing technical applications.

The apparatus and method of the present disclosure is not limited to any one particular gas turbine, combustion engine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein. In addition, the various injection systems can be used together, on a single nozzle, or on/with different nozzles in different portions of a single power generation system. Any number of different embodiments can be added or used together where desired, and the embodiments described herein by way of example are not intended to be mutually exclusive of one another.

Embodiments of the present disclosure can provide several technical and commercial advantages. For example, embodiments of the injection systems discussed herein can make use of existing reheat combustor technology by allowing a greater fraction of the total gas turbine fuel flow to be injected through the turbine nozzle, relative to other injection systems, thus improving efficiency. The location and size of injection systems added to a turbine nozzle, according to embodiments of the present disclosure, can also be varied to change the amount of fuel and carrier gas injected through the turbine nozzle to create different amounts of delay between the time of injection and the reaction (e.g., by autoignition) between the injected fuel and carrier gas. The use of separate carrier gas injection conduits and outlets can also allow injection systems of the present disclosure to use carrier gas, from a dedicated source instead of drawing carrier gas from a compressor component of a power generation system.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An injection system comprising:
   a combustor of a power generation system having a reaction chamber, wherein the reaction chamber includes a reaction section and an aft section;
   a turbine nozzle positioned downstream of the combustor of the power generation system, such that the aft section of the reaction chamber is interposed directly between the reaction section of the reaction chamber and the turbine nozzle, wherein the turbine nozzle separates the reaction chamber from a turbine blade stage of the power generation system;
   an injector assembly within the turbine nozzle, downstream of a high pressure turbine, and upstream of a low pressure turbine of the power generation system, wherein the injector assembly includes:
a mixing chamber beneath a pressure side surface or a suction side surface of the turbine nozzle, wherein the mixing chamber includes a discharge outlet through the pressure side surface or the suction side surface of the turbine nozzle;
a first injection conduit for delivering a carrier gas to the mixing chamber through a first outlet; and
a second injection conduit for delivering a fuel to the mixing chamber through a second outlet;
wherein a diameter of the discharge outlet is less than a diameter of the mixing chamber, and wherein the first outlet is oriented substantially in opposition to the second outlet,
and wherein the carrier gas and the fuel intermix within the mixing chamber upon leaving the first injection conduit and the second injection conduit, and wherein the mixing chamber is in fluid communication with a flow of a post-combustion fluid within the aft section of the reaction chamber.

2. The injection system of claim 1, wherein the mixing chamber is embedded within a dimple of the pressure side surface or suction side surface of the turbine nozzle.

3. The injection system of claim 1, wherein a contour of the discharge outlet prevents fluid communication of a combusted gas outside of the turbine nozzle into the mixing chamber.

4. The injection system of claim 1, wherein the combustor comprises a reheat combustor of the power generation system, and the pressure side surface or suction side surface of the turbine nozzle is exposed to a flow of fluid through the reheat combustor, wherein the power generation system comprises a gas turbine system.

5. The injection system of claim 1, wherein at least one of the first injection conduit and the second injection conduit is composed of a thermally conductive material, such that the carrier gas of the first injection conduit or the fuel of the second injection conduit absorbs heat from the pressure side surface or suction side surface of the turbine nozzle.

6. An injection system comprising:
a combustor of a power generation system having a reaction chamber, wherein the reaction chamber includes a reaction section and an aft section;
a turbine nozzle positioned downstream of the combustor of the power generation system, such that the aft section of the reaction chamber is interposed directly between the reaction section of the reaction chamber and the turbine nozzle, wherein the turbine nozzle separates the reaction chamber from a turbine blade stage of the power generation system;
an injector assembly within the turbine nozzle, downstream of a high pressure turbine and upstream of a low pressure turbine of the power generation system, wherein the injector assembly includes:
a mixing chamber including a housing positioned outside a pressure side surface or a suction side surface of the turbine nozzle, wherein the mixing chamber includes a discharge outlet through the housing outside the pressure side surface or the suction side surface of the turbine nozzle;
a first injection conduit for delivering a carrier gas to the mixing chamber through a first outlet;
at least one second injection conduit for delivering a fuel to the mixing chamber through at least one second outlet; and
wherein a diameter of the discharge outlet is less than a diameter of the mixing chamber, and wherein the first injection conduit and the at least one second injection conduit are in fluid communication with a flow of a post-combustion fluid within the aft section of the reaction chamber upstream of the turbine blade stage.

7. The injection system of claim 6, wherein the first injection conduit is composed of a thermally conductive material, such that the carrier gas of the first injection conduit or the fuel of the at least one second injection conduit absorbs heat from the pressure side surface or suction side surface of the turbine nozzle through the thermally conductive material.

8. An injection system comprising:
a reheat combustor of a power generation system having a reaction chamber, wherein the reaction chamber includes a reaction section and an aft section;
a turbine nozzle positioned downstream of the reheat combustor, such that the aft section of the reaction chamber is interposed directly between the reaction section of the reaction chamber and the turbine nozzle, wherein the turbine nozzle separates the reaction chamber from a turbine blade stage of the power generation system; and
an injector assembly within the turbine nozzle, downstream of a high pressure turbine, and upstream of a low pressure turbine of the power generation system, wherein the injector assembly includes:
a mixing chamber beneath a pressure side surface of a suction side surface of the turbine nozzle, wherein the mixing chamber includes a discharge outlet through the pressure side surface or the suction side surface of the turbine nozzle;
a first injection conduit for delivering a carrier gas to the mixing chamber through a first outlet; and
a second injection conduit for delivering a fuel to the mixing chamber through a second outlet, the second outlet being oriented substantially in opposition to the first outlet;
wherein a diameter of the discharge outlet is less than a diameter of the mixing chamber, the mixing chamber is positioned between the first outlet and the second outlet, upstream of the turbine blade stage, and wherein the carrier gas and the fuel intermix within the mixing chamber upon exiting the first outlet and the second outlet, and wherein the mixing chamber is in fluid communication with a post-combustion fluid within the aft section of the reaction chamber.

9. An injection system comprising:
a reheat combustor of a power generation system having a reaction chamber, wherein the reaction chamber includes a reaction section and an aft section; and
a turbine nozzle positioned downstream of the reheat combustor, such that the aft section of the reaction chamber is interposed directly between the reaction section of the reaction chamber and the turbine nozzle, wherein the turbine nozzle separates the reaction chamber from a turbine blade stage of the power generation system; and
an injector assembly within the turbine nozzle, downstream of a high pressure turbine and upstream of a low pressure turbine of the power generation system, wherein the injector assembly includes:
a mixing chamber including a housing positioned outside a pressure side surface or a suction side surface of the turbine nozzle, wherein the mixing chamber includes a discharge outlet through the housing outside the pressure side surface or the suction side surface of the turbine nozzle;

a first injection conduit for delivering a carrier gas to the mixing chamber through a first outlet disposed on the pressure side surface or the suction side surface of the turbine nozzle, at least one second injection conduit for delivering a fuel to the mixing chamber through at least one second outlet the at least one second outlet being disposed on the pressure side surface or the suction side surface of the turbine nozzle and wherein a diameter of the discharge outlet is less than a diameter of the mixing chamber, and wherein the first injection conduit and at least one second injection conduit are in fluid communication with a flow of a post-combustion fluid within the aft section of the reaction chamber upstream of the turbine blade stage.

\* \* \* \* \*